United States Patent [19]
Smith et al.

[11] Patent Number: 5,826,043
[45] Date of Patent: Oct. 20, 1998

[54] DOCKING STATION WITH SERIALLY ACCESSED MEMORY THAT IS POWERED BY A PORTABLE COMPUTER FOR IDENTIFYING THE DOCKING STATION

[75] Inventors: Michael G. Smith, Tustin; L. Randall Mote, Jr., Laguna Hills, both of Calif.

[73] Assignee: AST Research, Inc., Irvine, Calif.

[21] Appl. No.: 794,670

[22] Filed: Feb. 3, 1997

Related U.S. Application Data

[63] Continuation of Ser. No. 484,996, Jun. 7, 1995, abandoned.

[51] Int. Cl.⁶ .................................................. G06F 13/00
[52] U.S. Cl. ........................................ 395/281; 364/708.1
[58] Field of Search ................................... 361/683–686, 361/724; 364/708.1; 395/281–283

[56] References Cited

U.S. PATENT DOCUMENTS

| | | | |
|---|---|---|---|
| 4,133,028 | 1/1979 | Bernstein | 364/200 |
| 4,228,496 | 10/1980 | Katzman et al. | 364/200 |
| 4,365,294 | 12/1982 | Stokken | 395/550 |
| 4,757,439 | 7/1988 | Stinson | 364/200 |
| 4,862,392 | 8/1989 | Steiner | 364/522 |
| 5,099,417 | 3/1992 | Magar et al. | 395/425 |
| 5,265,218 | 11/1993 | Testa et al. | 395/325 |
| 5,265,238 | 11/1993 | Canova, Jr. et al. | 395/500 |
| 5,323,291 | 6/1994 | Boyle et al. | 361/686 |
| 5,377,357 | 12/1994 | Nishigaki et al. | 395/800 |
| 5,394,552 | 2/1995 | Shirota | 395/750 |
| 5,454,084 | 9/1995 | Uchikoga | 395/281 |
| 5,463,742 | 10/1995 | Kobayashi | 395/281 |
| 5,483,276 | 1/1996 | Brooks et al. | 348/2 |
| 5,488,572 | 1/1996 | Belmont | 364/514 R |
| 5,519,872 | 5/1996 | Khandekar et al. | 395/775 |
| 5,552,776 | 9/1996 | Wade et al. | 340/825.31 |
| 5,598,537 | 1/1997 | Swanstrom et al. | 395/281 |
| 5,598,539 | 1/1997 | Gephardt et al. | 395/281 |
| 5,625,829 | 4/1997 | Gephardt et al. | 395/800 |

OTHER PUBLICATIONS

Microsoft Corp., Chicago Docking System Design Guide (Version 1.0, Jan. 26, 1994), pp. 1–12.
P. Horowitz and Wiltu, The Art of Electronics (2d ed. 1989) pp. 801–802.
M. Manu, Computer System Architecture (2d ed. 1982) pp. 3–4.

Primary Examiner—Lance Leonard Barry
Attorney, Agent, or Firm—Knobbe, Martens, Olson & Bear, LLP

[57] ABSTRACT

A docking station for connection with a notebook computer includes a non-volatile memory chip which stores a serial number, an identification number, and configuration information pertaining to the docking station. When a notebook computer engages with the docking station, an electrical connection is provided between a microprocessor within the notebook computer and the non-volatile memory within the docking station so that the microprocessor within the computer 110 can interrogate the memory within the docking station. Based upon the information contained within the non-volatile memory, the software operating system of the notebook computer determines whether or not the notebook computer is compatible with the docking station. Furthermore, if selected configuration information is stored within the non-volatile memory within the docking station, this configuration information can be utilized by the software system of the notebook computer to allocate system resources.

6 Claims, 2 Drawing Sheets

DOCKING STATION WITH SERIALLY ACCESSED MEMORY THAT IS POWERED BY A PORTABLE COMPUTER FOR IDENTIFYING THE DOCKING STATION

This application is a continuation of U.S. patent application Ser. No. 08/484,996, filed Jun. 2, 1995 now abandoned.

BACKGROUND OF THE INVENTION

1. Field of the Invention

The present invention relates to memory for storing identification information and, in particular, memory use to identify a docking station for use with a notebook computer.

2. Description of the Related Art

Docking stations for notebook computers are well known in the art. Briefly, a docking station may be used as an expansion module for expanding the peripheral capabilities of a conventional notebook computer. That is, since most notebook computers are designed to be compact so that they can easily be carried for travel purposes, most notebook computers do not include many important peripheral devices such as a printer, a CD-ROM unit, etc. Furthermore, due to their compact size, most notebook computers do not include full size peripheral devices such as a full size keyboard or a full size display screen. Thus, many notebook computers have been designed to connect with a docking station which provides additional peripheral connect ports for peripheral units such as printers and CD-ROMs, as well as full sized keyboards and display terminals.

A number of complications arise when a notebook computer is to be connected to a docking station. One specific difficulty involves software which runs on the notebook computer. Very often software running on a notebook computer is tailored for a specific kind of computer configuration so that the software running on the notebook computer would not operate correctly in conjunction with the architecture of the docking station connected to the notebook computer. Furthermore, the architecture of certain notebook computers may not be compatible with the architecture of certain docking stations so that such a computer and docking station would not be compatible.

For these reasons, some software manufacturers have required that docking stations relay information to notebook computers connected at these docking stations so that the software can determine whether or not the docking station is compatible with the notebook computer. For example, Microsoft Corporation has described requirements for docking stations in the next version of WINDOWS. Specifically, Microsoft has required that docking stations contain non-volatile storage to store information concerning how the docking station is configured. The requirements further indicate a preference for the docking station to provide an identification number and a serial number for each product. However, no implementation for such a system is recommended.

SUMMARY OF THE INVENTION

A docking station for connection to a portable computer system having a power source comprises a connector which establishes an electrical connection between the portable computer and the docking station; an internal bus in communication with the connector; one or more peripheral connection ports in communication with the internal bus; and a memory within the docking station which connects to the portable computer via the connector and which receives power from the power source within the portable computer.

In a preferred embodiment, the memory comprises an electrically eraseable programmable read only memory (EEPROM).

In another preferred embodiment, the connector comprises a first connector which establishes a first connection between the internal bus of the docking station and an internal bus within the portable computer system, and a second connector which establishes a second connection between the memory and the power source within the portable computer.

In a particularly preferred embodiment, the second connector further establishes communication between the memory and processing circuitry within the portable computer system.

Under another aspect, the invention is a docking station for connection to a portable computer comprising an internal bus; a plurality of expansion slots connected to the internal bus; a connector which establishes communication between the internal bus and the portable computer; and a memory internal to the docking station and in communication with the portable computer via the connector. The memory is isolated from the internal bus of the docking station.

In a preferred embodiment, the the internal bus comprises a PCI bus.

In another preferred embodiment, the memory comprises an electrically eraseable programmable read only memory (EEPROM) configured to store an identification number which uniquely identifies the docking station.

DETAILED DESCRIPTION OF THE PREFERRED EMBODIMENTS

Figure 1:
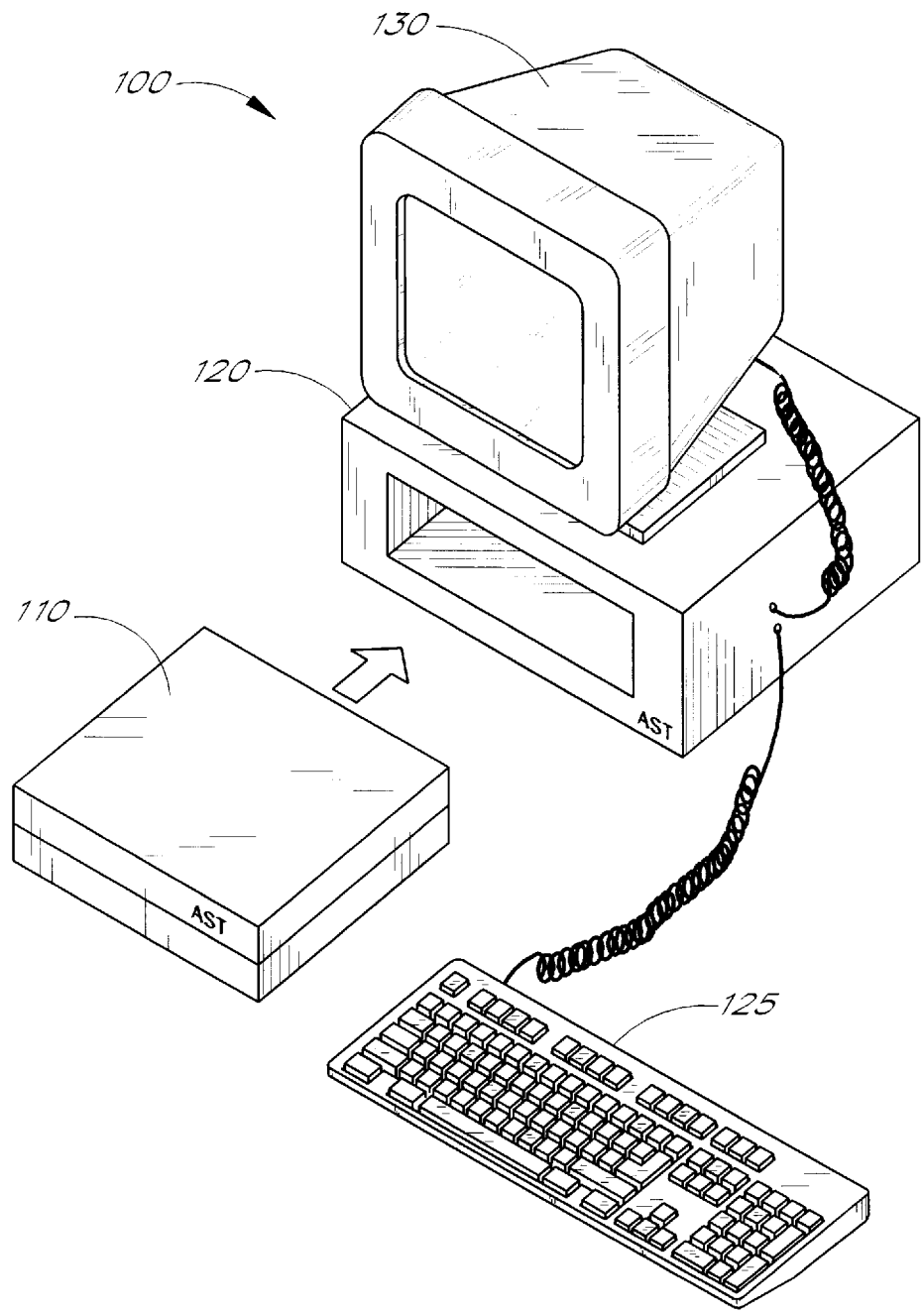
FIG. 1 is a perspective view showing the physical layout of a docking station which receives a notebook computer.

FIG. 1 is a perspective view of a PCI notebook/docking station system 100 which shows a notebook computer 110 prepared for engagement with a docking station 120 via an engagement slot 125 within the docking station. Typically, docking stations are used to provide full-sized peripherals and/or additional expansion capability to a notebook computer. For instance, as depicted in FIG. 1, the docking station 120 includes peripheral connections to a full-sized keyboard 125 and a full-sized monitor 130. As represented by an arrow in FIG. 1, the notebook computer 110, which, in one embodiment, comprises an AST ASCENTIA notebook computer, slides into the engagement slot 125 and electrically connects to circuitry within the docking station 120 via a connector (not shown in FIG. 1).

Once the notebook computer 110 is engaged within the docking station 120, a user may operate the notebook computer 110 using the peripheral devices, such as the keyboard 125 and the display 130, via the circuitry within the docking station 120. The docking station 120 may also include additional peripheral devices such as a hard disk drive, a printer, etc. (not shown).

Figure 2:
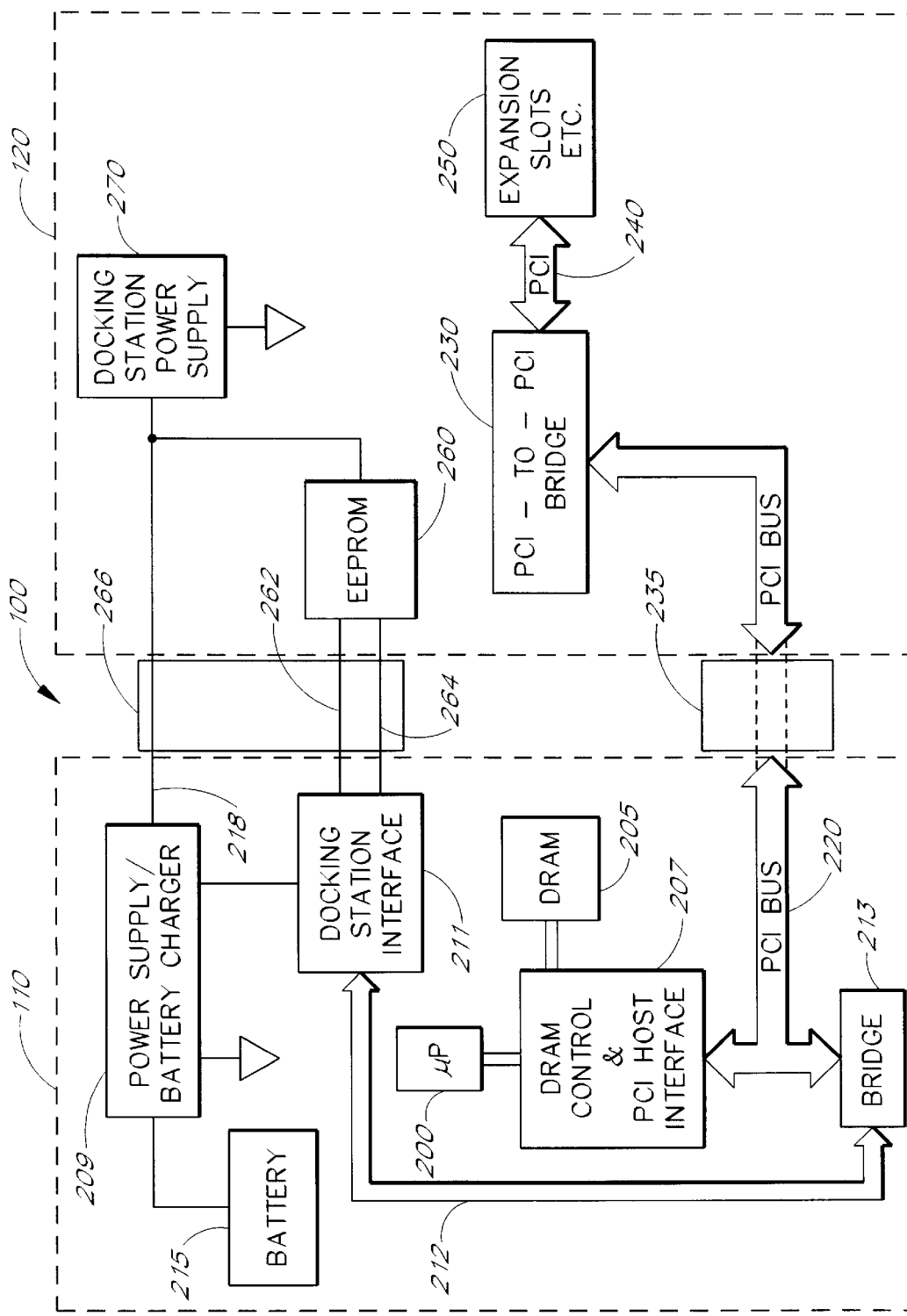
FIG. 2 is a highly simplified block diagram which depicts the main functional elements internal to the notebook computer and docking station of FIG. 1.

FIG. 2 is a highly simplified overall schematic block diagram showing the main internal elements of the computer 110 as connected to the docking station 120. The computer 110 includes a microprocessor 200 and memory 205 in communication via system logic 207. The microprocessor, for example, comprises an INTEL PENTIUM microprocessor, or the like, while the memory preferably comprises a dynamic random access memory (DRAM). The system logic advantageously includes a DRAM controller and a PCI host interface circuitry, in addition to other well known system logic. The microprocessor 200 and memory 205 receive power from a power supply/battery charger 209 via power lines (not shown). A battery 215 which, for example, comprises a rechargeable 5-volt battery pack, acts as a voltage source for the power supply 209.

The microprocessor 200 and memory 205 communicate with other devices within the computer 110 via the system logic 207 and an internal peripheral component interconnect (PCI) bus 220. The PCI bus 220 communicates with a docking station interface 211 via an ISA bus 212 and a PCI-to-ISA bridge 213. Thus, the microprocessor 200 and memory 205 are placed in communication with the docking station interface 211. Other devices connected to the internal PCI bus 220 may include, for example, a PCI video controller, etc., which are not shown in FIG. 2 for simplicity because these are not necessary for a complete understanding of the present invention.

The internal PCI bus 220 also connects to a PCI-to-PCI bridge 230 via a docking port 235. The PCI-to-PCI bridge 230 is preferably constructed in accordance with the specifications laid out in Revision 1.0 of the PCI-to-PCI Bridge Architecture Specification available from the PCI Special Interest Group, N/SHS3-15A, 5200 N.E. Elam Young Parkway, Hillsboro, Oreg. 97124-6497. The PCI-to-PCI bridge 230 communicates with multiple peripheral expansion slots 250 via a docking station internal PCI bus 240. The expansion slots 250 provide for connection of multiple peripheral units such as a printer, a sound card, etc., which may operate under the control of the computer 110 when the computer 110 is connected to the docking station 120.

The microprocessor 200 and memory 205 within the computer 110 further connect to an electrically-eraseable, programmable, read-only memory (EEPROM) 260 which, for example, may comprise a 2 Kbyte memory chip, available from XICOR and sold under the Model Number X24C16. Of course, it will be appreciated that other kinds of non-volatile memory chips, such as other kinds of PROMs or other models of EEPROMS, may be used in accordance with the present invention. The EEPROM 260 is preferably electrically programmed with the appropriate data (discussed below) after the EEPROM 260 is installed into the docking station 120. In one preferred embodiment, four pins are necessary to connect the computer 110 to the memory 260 via a connector 266. It should be noted here that, in one embodiment, the connector 266, although depicted as separate from the connector 235 in FIG. 2 for ease of illustration, is formed as a part of the connector 235. Two pins are used to supply power to the memory 260 from the battery 215, although the ground pin connection is not shown. Thus, the line 218 acts as a source voltage level to the EEPROM 260, while two other lines 262, 264 provide for bi-directional serial communication between the microprocessor and memory 200 and the memory 260. In one preferred embodiment, the line 262 transmits data while the line 264 provides a clock signal. A docking station power supply 270 may also be used to supply power to the EEPROM 260, although it should be understood that the power supply 270 within the docking station is not necessary to provide power to the EEPROM 260.

The microprocessor 200 and memory 205 are powered by the battery 215 (via the power supply/charger 209) to receive, process and transmit data. The microprocessor 200 and memory 205 transmit and receive data, address and command signals via the PCI bus 220 so that peripheral units connected within the expansion slots 250 of the docking station 120 may transmit and receive signals to and from the microprocessor 200 and memory 205 via the PCI bus 240, the PCI-to-PCI bridge 230, the connector 235 and the PCI bus 220. The data transaction protocol between the microprocessor and memory 200 and the internal components of the docking station 120 are conventional and need not be described in detail to understand the present invention.

When the notebook computer 110 connects to the docking station 120, the microprocessor 200 and memory 205 are placed in communication with the memory 260 via the connector 266. In a preferred embodiment, the power supply 209 within the computer 110 provides power to the memory 260 via the connector line 218. Furthermore, the microprocessor 200 and memory 205 are able to access data stored within the memory 260 via the serial communication lines 262, 264 without having to power up the docking station. In one embodiment, all data transmitted to the memory 260 from the microprocessor 200 and memory 205 are provided along the line 262 with the same data being clocked by the line 264. Data can be read or written to the memory 260 by sending the appropriate commands, address, and data. Methods of serial access to the memory 260 are well known.

Advantageously, the read only memory 260 includes a serial number, corresponding to the serial number of the individual docking station 120, an identification number which identifies the kind of docking station which the computer 110 is connected to. In a particularly preferred embodiment, the memory 260 also includes configuration information accessible by the microprocessor and memory 200 via the lines 262, 264. This configuration information identifies, for example, the kind and number of expansion slots 250 and the hardware configured channel numbers associated with each expansion slot.

The microprocessor 200 and memory 205 transmit serial, address and control data to access data storage locations within the read only memory 260, and the read only memory 260 outputs the data stored at the locations to the microprocessor and memory. As indicated above, this data stored in the access memory locations indicates a serial is number, identification number, and configuration information about the docking station 120. The software running on the notebook computer 110 evaluates the information sent by the EEPROM 260 and determines whether the docking station 120 is compatible with the computer 110. The configuration information found in the memory 260 is used by the software operating on the notebook computer 110 to determine the features of the docking station 120 for use by the notebook computer 110 in order to assign the overall system resources when the notebook computer 110 is docked in the docking station 120. In addition, the invention provides docking station security. The notebook computer 110 is designed such that the notebook computer 110 will not recognize the docking station 120 unless the software within the computer 110 is able to read the correct serial number from the docking station memory 260. In addition, further information may be added to the EEPROM 260 so that the EEPROM 260 accepts a "key" signal from the notebook computer 110 which, when sent to the docking station memory 260, activates a signal which allows the notebook computer 110 to access the docking station 120.

For further information concerning the requirements for accessing a docking station for connection to a notebook computer, see *The Chicago Docking System Design Guide*, Version 1.0, provided by Microsoft Corporation.

Although the preferred embodiment of the present invention has been described above, it will be apparent to those of ordinary skill in the art that obvious modifications and adaptations of the invention can be made without departing from the spirit or essence of the invention. Therefore, the above description should be understood as illustrative and not restrictive and, consequently, the scope of the present invention is defined by the appended claims.

We claim:

1. A docking station for connection to a portable computer, said docking station comprising:

an internal bus;

a plurality of expansion slots connected to said internal bus;

a connector which establishes communication between said internal bus and said portable computer; and a memory internal to said docking station and in electrical a communication with said portable computer, said memory operating independently of said internal bus of said docking station and communicating with said portable computer without using said internal bus, said memory internal to said docking station receiving power from said portable computer when said portable computer is connected to said docking station irrespective of whether sower is applied to said docking station.

2. A docking station as defined in claim 1, wherein said internal bus comprises a PCI bus.

3. A docking station as defined in claim 1, wherein said memory comprises an electrically eraseable programmable read only memory (EEPROM) configured to store an identification number which uniquely identifies said docking station.

4. The docking station as defined in claim 1, wherein said memory internal to said docking station is a nonvolatile memory.

5. The docking station as defined in claim 1, wherein said memory internal to said docking station stores information which identifies said docking station to said portable computer when said portable computer accesses said memory.

6. The docking station as defined in claim 1, wherein said memory internal to said docking station operates from power supplied by said portable computer irrespective of whether power is applied to said docking station to operate said internal bus of said docking station.

* * * * *

UNITED STATES PATENT AND TRADEMARK OFFICE
CERTIFICATE OF CORRECTION

PATENT NO. : 5,826,043

DATED : October 20, 1998

INVENTOR(S) : Michael G. Smith

It is certified that error appears in the above-identified patent and that said Letters Patent is hereby corrected as shown below:

In column 6 at line 2, change "whether sower is" to --whether power is--.

Signed and Sealed this

Fifteenth Day of May, 2001

Attest:

NICHOLAS P. GODICI

Attesting Officer

Acting Director of the United States Patent and Trademark Office